US012809906B2

(12) United States Patent
Xu et al.

(10) Patent No.: US 12,809,906 B2
(45) Date of Patent: Nov. 24, 2026

(54) ITEM KNOWLEDGE GRAPH WITH LARGE LANGUAGE MODELS

(71) Applicant: DoorDash, Inc., San Francisco, CA (US)

(72) Inventors: Steven Guanxing Xu, Issaquah, WA (US); Sree Chaitanya Vadrevu, San Francisco, CA (US); Aparimeya Taneja, San Francisco, CA (US)

(73) Assignee: DoorDash, Inc., San Francisco, CA (US)

( * ) Notice: Subject to any disclaimer, the term of this patent is extended or adjusted under 35 U.S.C. 154(b) by 0 days.

(21) Appl. No.: 19/184,751

(22) Filed: Apr. 21, 2025

(65) Prior Publication Data

US 2025/0328577 A1 Oct. 23, 2025

Related U.S. Application Data

(60) Provisional application No. 63/637,274, filed on Apr. 22, 2024.

(51) Int. Cl.
*G06F 16/38* (2019.01)
*G06F 16/334* (2025.01)
*G06F 16/35* (2019.01)
*G06N 3/08* (2023.01)

(52) U.S. Cl.
CPC ............ *G06F 16/38* (2019.01); *G06F 16/334* (2019.01); *G06F 16/35* (2019.01); *G06N 3/08* (2013.01)

(58) Field of Classification Search
CPC ......... G06F 16/38; G06F 16/334; G06F 16/35
USPC ........................................................ 707/737
See application file for complete search history.

(56) References Cited

U.S. PATENT DOCUMENTS

| | | | | |
|---|---|---|---|---|
| 6,384,850 | B1 | 5/2002 | McNally et al. | |
| 6,871,325 | B1 | 3/2005 | McNally et al. | |
| 6,982,733 | B1 | 1/2006 | McNally et al. | |
| 8,146,077 | B2 | 3/2012 | McNally et al. | |
| 9,009,060 | B2 | 4/2015 | McNally | |
| 9,747,651 | B2 | 8/2017 | McNally | |
| 10,970,797 | B2 | 4/2021 | McNally | |
| 11,276,130 | B2 | 3/2022 | McNally | |
| 11,842,415 | B2 | 12/2023 | McNally | |
| 11,847,587 | B1 | 12/2023 | McNally | |
| 2014/0249937 | A1 | 9/2014 | McNally | |
| 2026/0004336 | A1* | 1/2026 | Wu | G06Q 30/0635 |

FOREIGN PATENT DOCUMENTS

WO 0122289 A1 3/2001

OTHER PUBLICATIONS

"Civil Action No. 2:23-CV-2165-WSH", Amended Complaint for Patent Infringement—*Ameranth, Inc.*, Plaintiff, V. *Doordash, In., Eat'n Park Restaurants, LLC, and Eat'n Park Hospitality Group, Inc.*, Defendants, Sep. 17, 2024, pp. 1-91.

(Continued)

*Primary Examiner* — Baoquoc N To
(74) *Attorney, Agent, or Firm* — Kilpatrick Townsend & Stockton LLP

(57) ABSTRACT

A method includes a computer receiving an item description. The computer can determine output extraction data from the item description using a first large language model. The output extraction data includes item characteristic data. The computer can store the output extraction data in a database.

20 Claims, 5 Drawing Sheets

(56) References Cited

OTHER PUBLICATIONS

Wang et al., "GPT-NER: Named Entity Recognition via Large Language Models," Apr. 20, 2023, last updated Oct. 7, 2023, located at https://arxiv.org/abs/2304.10428, 21 pages.
U.S. Appl. No. 18/145,942 , "Unpublished U.S. Patent Application No.", Dec. 23, 2022.

* cited by examiner

ITEM KNOWLEDGE GRAPH WITH LARGE LANGUAGE MODELS

CROSS-REFERENCES TO RELATED APPLICATIONS

This application claims the benefit of U.S. Provisional Application No. 63/637,274, filed Apr. 22, 2024, which is herein incorporated by reference in its entirety for all purposes.

SUMMARY

One embodiment is related to a method comprising: receiving, by a computer, an item description; determining, by the computer, output extraction data from the item description using a first large language model, wherein the output extraction data is item characteristic data; and storing, by the computer, the output extraction data in a database.

Another embodiment is related to a computer comprising: a processor; and a computer-readable medium coupled to the processor, the computer-readable medium comprising code executable by the processor for implementing a method comprising: receiving an item description; determining output extraction data from the item description using a first large language model, wherein the output extraction data is item characteristic data; and storing the output extraction data in a database.

Another embodiment is related to a system comprising: a service provider computer in operative communication with a central server computer; and the central server computer comprising: a processor; and a computer-readable medium coupled to the processor, the computer-readable medium comprising code executable by the processor for implementing a method comprising: receiving an item description; determining output extraction data from the item description using a first large language model, wherein the output extraction data is item characteristic data; and storing the output extraction data in a database.

Further details regarding embodiments of the disclosure can be found in the Detailed Description and the Figures.

DETAILED DESCRIPTION

Figure 1:
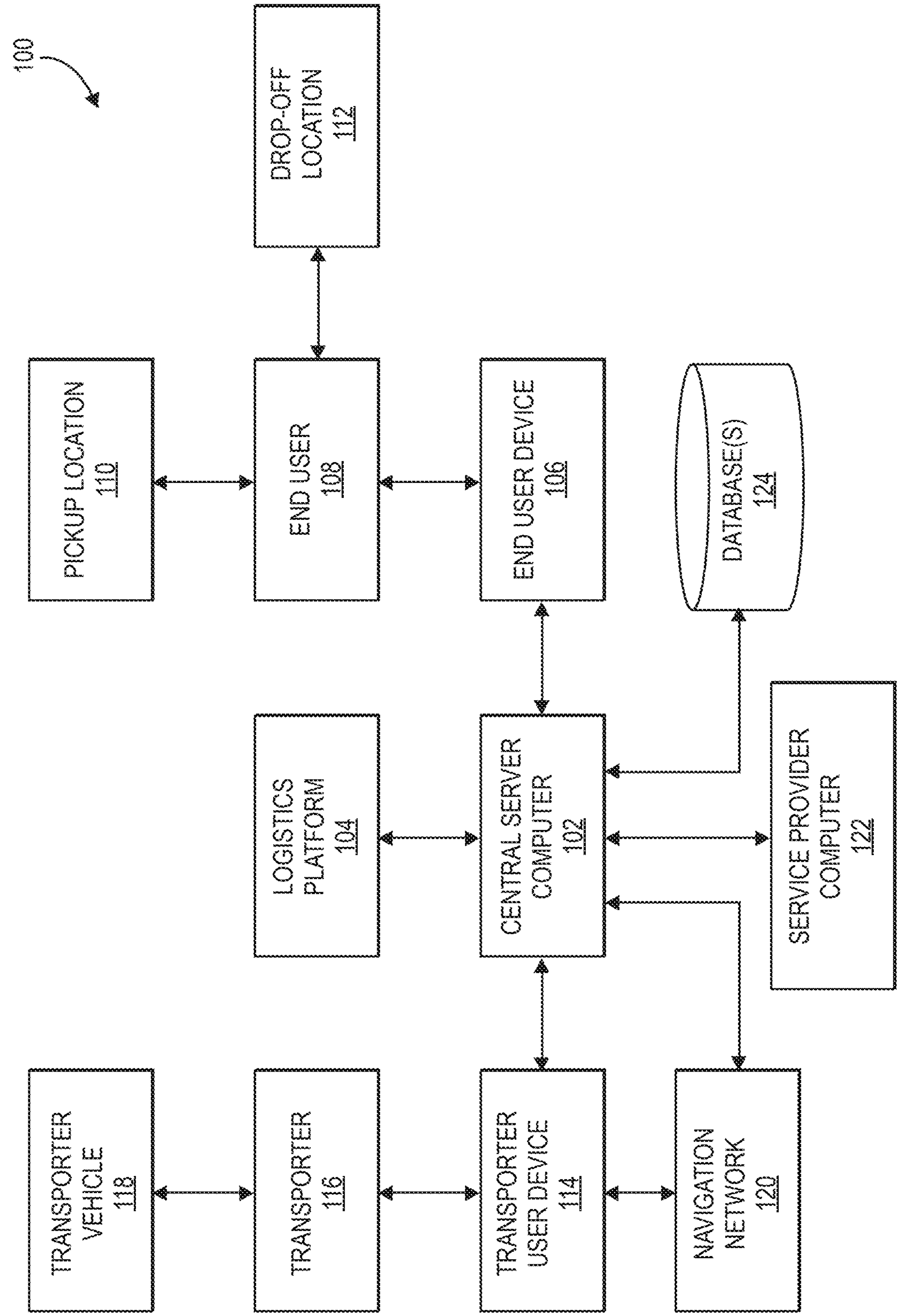
FIG. 1 shows a block diagram of a fulfillment system according to embodiments.

Prior to discussing embodiments of the disclosure, some terms can be described in further detail.

An "item" can be an individual article or unit. Examples of items can include perishable items such as food items, beauty items (e.g., cosmetics), office supply products (e.g., staples, paper, and ink), hardware items (e.g., nails, hammers, wrenches), electronic devices (e.g., computers, phones, jewelry, etc.).

An "item description" can be a representation of an item. An item description can describe properties of the item. An item description can include a name of the item. An item description can be a text description of an item.

"Output extraction data" can include information extracted from an input. Output extraction data can include information extracted (e.g., determined from and/or about) from an item description. Output extraction data can be item characteristic data that indicates characteristics of an originating item description.

"Item characteristic data" can include information about a feature or quality that relates to an item. Item characteristic data can be determined as output extraction data that is determined from an item description. Item characteristic data can indicate information about an item. For example, item characteristic data can include a brand name (e.g., or other brand data), a size, one or more dietary restrictions, alcohol content, and/or any other characteristics of the item.

A "user" may include an individual or a computational device. In some embodiments, a user may be associated with one or more personal accounts and/or mobile devices. In some embodiments, the user may be a consumer or customer.

A "user device" may be any suitable electronic device that can process and communicate information to other electronic devices. The user device may include a processor and a computer-readable medium coupled to the processor, the computer-readable medium comprising code, executable by the processor. The user device may also each include an external communication interface for communicating with other entities. Examples of user devices may include a mobile device, a laptop or desktop computer, a wearable device, etc.

A "transporter" can be an entity that transports something. A transporter can be a person that transports an item using a transportation device (e.g., a car). In other embodiments, a transporter can be a transportation device that may or may not be operated by a human. Examples of transportation devices include cars, boats, scooters, bicycles, drones, airplanes, etc.

A "fulfillment request" can be a request to provide a resource in response to a request. For example, a fulfillment request can include an initial communication from an end user device to a central server computer for a first service provider computer to fulfill a purchase request for a resource such as food. A fulfillment request can be in an initial state, a completed state, or a final state. After the fulfillment request is in a final state, it can be accepted by the central server computer, and the central server computer can send a fulfillment request confirmation to the end user device. A fulfillment request can include one or more selected items from a selected service provider. A fulfillment request can also include user features of the end user providing the fulfillment request.

A "delivery order" can include a thing made, supplied, or served to be provided to a location. Delivery orders can include requests to provide one or more items from a pickup location to a drop-off location. Delivery orders can include orders to deliver items from a service provider location to an end user location. Delivery orders can include orders to deliver items from an end user location to a service provider location. A delivery order can include data to fulfill the delivery request including an order type, an indication of an item, a pickup location, and a drop-off location. In some embodiments, the delivery order can include a scheduling range by which that order is to be fulfilled. A delivery order can also include metadata. The metadata can include data relating to the delivery order (e.g., related order numbers, instruction data, etc.). An example type of delivery order can be a return order (e.g., to deliver an item that is to be returned).

A "machine learning model" (ML model) can refer to a software module configured to be run on one or more processors to provide a classification or numerical value of a property of one or more samples. An ML model can include various parameters (e.g., for coefficients, weights, thresholds, functional properties of function, such as activation functions). As examples, an ML model can include at least 10, 100, 1,000, 5,000, 10,000, 50,000, 100,000, or one million parameters. An ML model can be generated using sample data (e.g., training samples) to make predictions on test data. Various number of training samples can be used, e.g., at least 10, 100, 1,000, 5,000, 10,000, 50,000, 100,000, or at least 200,000 training samples. One example is an unsupervised learning model such as hidden Markov model (HMM), clustering (e.g., hierarchical clustering, k-means, mixture models, model-based clustering, density-based spatial clustering of applications with noise (DBSCAN), and OPTICS algorithm), approaches for learning latent variable models such as Expectation-maximization algorithm (EM), method of moments, and blind signal separation techniques (e.g., principal component analysis, independent component analysis, non-negative matrix factorization, singular value decomposition), and anomaly detection (e.g., local outlier factor and isolation forest). Another example type of model is supervised learning that can be used with embodiments of the present disclosure. Example supervised learning models may include different approaches and algorithms including analytical learning, statistical models, artificial neural network (e.g. including convolutional and/or transformer layers) that may have 1-10 layers as examples, recurrent neural network (e.g., long short term memory (LSTM)), boosting (meta-algorithm), bootstrap aggregating (bagging) such as random forests, support vector machine (SVM), support vector (SVR), Bayesian statistics, case-based reasoning, decision tree learning, inductive logic programming, linear regression, logistic regression, Gaussian process regression, genetic programming, group method of data handling, kernel estimators, learning automata, learning classifier systems, minimum message length (decision trees, decision graphs, etc.), multilinear subspace learning, naive Bayes classifier, maximum entropy classifier, conditional random field, nearest neighbor algorithm, probably approximately correct learning (PAC) learning, ripple down rules, a knowledge acquisition methodology, symbolic machine learning algorithms, subsymbolic machine learning algorithms, minimum complexity machines (MCM), ordinal classification, data pre-processing, handling imbalanced datasets, statistical relational learning, or Proaftn (a multicriteria classification algorithm), or an ensemble of any of these types. Supervised learning models can be trained in various ways using various cost/loss functions that define the error from the known label (e.g., least squares and absolute difference from known classification) and various optimization techniques, e.g., using backpropagation, steepest descent, conjugate gradient, and Newton and quasi-Newton techniques.

A "deep neural network (DNN)" may be a neural network in which there are multiple layers between an input and an output. Each layer of the deep neural network may represent a mathematical manipulation used to turn the input into the output. In particular, a "recurrent neural network (RNN)" may be a deep neural network in which data can move forward and backward between layers of the neural network.

A "model database" may include a database that can store machine learning models. Machine learning models can be stored in a model database in a variety of forms, such as collections of parameters or other values defining the machine learning model. Models in a model database may be stored in association with keywords that communicate some aspects of the model. For example, a model used to evaluate news articles may be stored in a model database in association with the keywords "news," "propaganda," and "information." A computer can access a model database and retrieve models from the model database, modify models in the model database, delete models from the model database, or add new models to the model database.

A "feature vector" may include a set of measurable properties (or "features") that represent some object or entity. A feature vector can include collections of data represented digitally in an array or vector structure. A feature vector can also include collections of data that can be represented as a mathematical vector, on which vector operations such as the scalar product can be performed. A feature vector can be determined or generated from input data. A feature vector can be used as the input to a machine learning model, such that the machine learning model produces some output or classification. The construction of a feature vector can be accomplished in a variety of ways, based on the nature of the input data. For example, for a machine learning classifier that classifies words as correctly spelled or incorrectly spelled, a feature vector corresponding to a word such as "LOVE" could be represented as the vector (12, 15, 22, 5), corresponding to the alphabetical index of each letter in the input data word. For a more complex "input," such as a human entity, an exemplary feature vector could include features such as the human's age, height, weight, a quantitative representation of relative happiness, etc. Feature vectors can be represented and stored electronically in a feature store. Further, a feature vector can be normalized (i.e., be made to have unit magnitude). As an example, the feature vector (12, 15, 22, 5) corresponding to "LOVE" could be normalized to approximately (0.40, 0.51, 0.74, 0.17).

A "language model" can include a probabilistic model relating to evaluating natural language. A language model can include a large language model (LLM). A large language model can include a transformer and can be utilized to evaluate data other than natural language.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Service providers make items available to users. Service provider computers can provide information about available items (e.g., item data) to a central server computer such that the central server computer can facilitate the delivery of the items from the service providers to end users via transporters. The central server computer can maintain a database of item data that can be used to show available items to end users for selection.

When a service provider computer first enrolls with the central server computer, the central server computer can add the service provider computer's item data, such as stock keeping unit (SKU) data, to the database. Item data from different service provider computers comes in varying formats and quality. The item data may, for example, have missing or incorrect item characteristic values. To ensure the database's quality does not degrade, the central server computer can standardize and enrich raw service provider data.

Historically, item data enrichment through extracting and tagging characteristics has been a purely manual process. However, such a process leads to long turnaround times, high resource costs, and many inaccuracies such that a second reviewer must audit the results generated by the first. Having high-quality, complete, and accurate characteristics for each item data can be important for providing better selection and fulfillment.

For example, accurate item characteristics can allow end users to easily find an item in a delivery application and allows the end users to be confident that what they order matches what they want and what they receive. Furthermore, transporters can have comprehensive information, due to the item data, to find the correct item at a service provider location (e.g., a store).

As another example, accurate item characteristics allow for improved end user personalization. Item characteristic data allows the central server computer to group items based on commonalities, building an item profile for each end user around their affinities to certain item characteristics. These are the building blocks for providing highly relevant and personalized recommendations using, for example, a machine learning recommendation engine.

Machine learning classifiers can be trained to determine classifications of characteristics of item data when the central server computer receives the item data for the first time from the service provider computer. However, building an item characteristics data determination and/or tagging classification model from scratch requires a significant amount of labeled training data to reach the desired accuracy. This is often known as the cold-start problem of natural language processing (NLP). Data collection slows model development, delays adding new items to the active database, and creates computational resource costs.

Embodiments solve the technical cold-start problem by utilizing large language models. For example, embodiments can utilize large language models (LLMs) to circumvent the cold-start problem by generating labeled item characteristic data. Large language models are deep-learning models trained on vast amounts of data. Examples include OpenAI's GPT-4, Google's Bard, and Meta's Llama. Due to their broad knowledge, large language models can perform natural language processing with reasonable accuracy without requiring many, if any, labeled examples. A variety of prompts can be used to instruct large language models to solve different natural language processing problems.

Embodiments provide for large language models that can extract characteristics from unstructured item data, allowing the central server computer to build a high-quality database of item data that can, in turn, provide an optimal process for end users, transporters, and service providers.

As an illustrative example, embodiments of the disclosure allow for a computer (e.g., the central server computer or a computer in communication therewith) that can obtain accurate characteristic data for items based on an item description. The computer can receive an item description from the service provider computer to begin a process of listing the new item for the service provider computer in the delivery application. The service provider computer can provide the item description to the computer when requesting to add the item description to the delivery application.

The computer can utilize a machine learning classification model to classify item characteristics of the item description to determine whether or not the item is associated with item characteristics that are already stored in the database. For example, the computer can classify a brand name or the size of the item based on the item description. The computer can classify the item description as a known classification that is in the database. If the item description is of an unknown classification (e.g., not yet experienced by the machine learning classification model and/or the database), then the computer can provide the item description to a first large language model.

Using the first large language model, the computer can determine output extraction data from the item description. For example, the computer can input the item description into a first large language model. The first large language model can be a machine learning model (e.g., an artificial neural network) that is trained to determine text outputs based on inputs (e.g., text inputs, image inputs, etc.). The first large language model can determine output extraction data that includes data related to the input item description. The output extraction data can be item characteristic data that indicates characteristics of the originating item description. For example, the item characteristic data can include a brand data, a size data, dietary restriction data, alcohol content data, and/or any other characteristics of the item associated with the item description.

After determining the output extraction data, the computer can determine whether or not the output extraction data includes a classification (e.g., brand name, etc.) that matches previously stored classifications in the database. In some embodiments, the computer can utilize a second large language model to determine whether or not the output extraction data includes a classification that matches a classification in the database. If the output extraction data does not include a classification that matches a previously stored classification, the computer can store the output extraction data in the database.

As new data is added to the database, the computer can utilize the output extraction data (e.g., identified item characteristic data) and the item description as labeled item descriptions for training data. The computer can further train the machine learning classification model with the labeled item descriptions such that the machine learning classification model can make more accurate classifications for subsequently received item descriptions.

FIG. 1 shows a system 100 according to embodiments of the disclosure. The system of FIG. 1 includes a central server computer 102, a logistics platform 104, an end user device 106, an end user 108, a pickup location 110, a drop-off location 112, a transporter user device 114, a transporter 116, a transporter vehicle 118, a navigation network 120, a service provider computer 122, and database(s) 124.

The central server computer 102 can be in operative communication with the logistics platform 104, the end user device 106, the transporter user device 114, the navigation network 120, the service provider computer 122, and the database(s) 124. The transporter user device 114 can be in operative communication with the navigation network 120.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. For example, although FIG. 1 shows one transporter 116, there can be two, three, or more transporters, transporter user devices, and transporter vehicles, etc.

Messages between the devices in the system 100 in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The central server computer 102 can include a server computer that can facilitate the fulfillment of fulfillment requests received from the end user device 106. For example, the central server computer 102 can identify the transporter 116 operating the transporter user devices 114 that is capable of satisfying the fulfillment request. The central server computer 102 can identify the transporter user device 114 that can satisfy the fulfillment request based on any suitable criteria (e.g., transporter location, service provider location, end user destination, end user location, transporter mode of transportation, etc.).

The central server computer 102 can receive item descriptions from the service provider computer 122 when the service provider computer 122 is requesting to list a new item on a delivery application maintained by the central server computer 102. The central server computer 102 can determine one or more classifications and a confidence level for the item description using a machine learning classification model. If the confidence level is below a predetermined confidence threshold, the central server computer 102 can determine output extraction data from the item description using a first large language model. The output extraction data can be item characteristic data. The central server computer 102 can store the output extraction data in a database. Using the output extraction data in the database, the central server computer 102 can further train the machine learning classification model using the output extraction data as a labeled item description, where the item descriptions are labeled with the item characteristic data.

The logistics platform 104 can include a location determination system, which can determine the location of various user devices such as transporter user devices (e.g., the transporter user device 114) and end user devices (e.g., the end user device 106). The logistics platform 104 can also include routing logic to efficiently route transporters using the transport user devices to various pickup locations that have the packages that are to be delivered to drop-off locations. Efficient routes can be determined based on the locations of the transporters, the locations of the pickup locations, the locations of the drop-off locations, as well as external data such as traffic patterns, the weather, etc. The logistics platform 104 can be part of the central server computer 102 or can be system that is separate from the central server computer 102.

The end user device 106 can include a device operated by the end user 108. The end user device 106 can generate and provide fulfillment request messages to the central server computer 102. The fulfillment request message can indicate that the request (e.g., a request for a service) can be fulfilled by the service provider computer 122. For example, the fulfillment request message can be generated based on a cart selected at checkout during a transaction using a central server computer application installed on the end user device 106. The fulfillment request message can include one or more items from the selected cart.

The end user device 106 can provide a fulfillment request message to the central server computer 102 that indicates that the end user device 106 is requesting that the transporter pick up an item from the pickup location 110 (e.g., end user's 108 location) and deliver the item to the drop-off location 112 (e.g., the service provider computer's 122 location).

The pickup location 110 can be a location in which items are stored. Examples of the pickup location 110 may be a house or an apartment, a mailbox, a service provider location (e.g., a retail store, a grocery store, a dry cleaning store), a pickup hub, etc. Items can first be obtained from a pickup location 110 and then be transported to the drop-off location 112. Examples of the drop-off location 112 can be similar to the pickup location 110, such a house or apartment, a mailbox, a retail store, a grocery store, a dry cleaning store, a pickup hub, etc. In one example, the pickup location 110 can be a pizza store that the end user 108 orders a pizza from, and the drop-off location 112 can be an apartment in which the end user 108 resides. In another example, the pickup location 110 can a house that the end user 108 resides in, and the drop-off location 112 can be a post office that mails an item previously obtained by the end user 108 to complete a return of the item.

The transporter user device 114 can include a device operated by the transporter 116. The transporter user device 114 can include a smartphone, a wearable device, a personal assistant device, etc. The transporter 116 can submit a request to fulfil an end user's fulfillment request via an acceptance message. For example, the transporter user device 114 can generate and transmit a request to fulfill a particular end user's fulfillment request to the central server computer 102. The central server computer 102 can notify the transporter user device 114 of the fulfillment request. The transporter user device 114 can respond to the central server computer 102 with a request to perform the delivery to the end user as indicated by the fulfillment request.

The transporter vehicle 118 can include a vehicle operated by the transporter 116. The transporter vehicle 118 can include a car, a truck, a van, a motorcycle, a bicycle, a drone, or other vehicle capable of being operated by the transporter 116. In other embodiments, the transporter 116 can be a vehicle that can be operated by an operator or can be autonomous.

The navigation network 120 can provide navigational directions to the transporter user device 114. For example, the transporter user device 114 can obtain a location from the central server computer 102. The location can be a service provider parking location, a service provider location, an end user parking location, an end user location, etc. The navigation network 120 can provide navigational data to the location. For example, the navigation network 120 can be a global positioning system that provides location data to the transporter user device 114.

The service provider computer 122 include a computer operated by a service provider. For example, the service provider computer 122 can be a food provider computer that is operated by a food provider. The service provider computer 122 can offer to provide services to the end user 108 of the end user device 106. The service provider computer 122 can receive requests to prepare one or more items for delivery from the central server computer 102. The service provider computer 122 can initiate the preparation of the one or more items that are to be delivered to the end user 108 of the end user device 106 by the transporter 116 of the transporter user device 114.

The service provider computer 122 can provide item descriptions and/or other information related to items, such as item categories, to the central server computer 102 to be included in a delivery application.

The database(s) 124 can include any suitable database. The database may be a conventional, fault tolerant, relational, scalable, secure database such as those commercially available from Oracle™ or Sybase™. The database(s) 124 can store fulfilment data, resource data, image data, etc.

Figure 2:
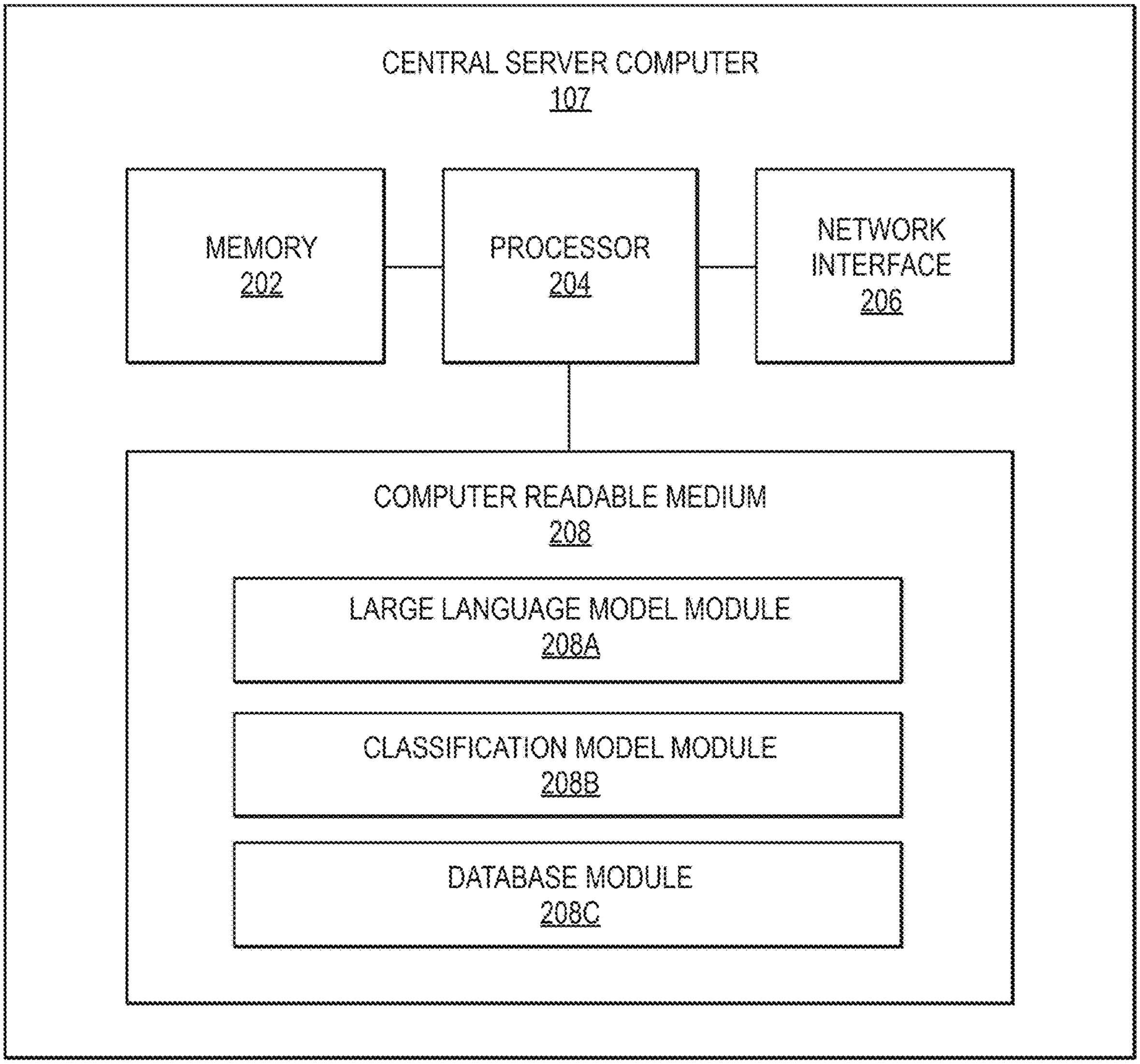
FIG. 2 shows a block diagram of components of a central server computer according to embodiments.

FIG. 2 shows a block diagram of a central server computer 102 according to embodiments. The exemplary central server computer 102 may comprise a processor 204. The processor 204 may be coupled to a memory 202, a network interface 206 and a computer readable medium 208. The computer readable medium 208 can include one or more modules. The computer readable medium 208 can include a large language model module 208A, a classification model module 208B, and a database module 208C.

The memory 202 can be used to store data and code. For example, the memory 202 can store item characteristics data, LLM data, prompts, templates, item data, item descriptions, etc. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The computer readable medium 208 may comprise code, executable by the processor 204, for performing a method comprising: receiving, by a computer, an item description; determining, by the computer, output extraction data from the item description using a first large language model, wherein the output extraction data is item characteristic data; and storing, by the computer, the output extraction data in a database.

The large language model module 208A may comprise code or software, executable by the processor 204, for training, utilizing, and/or maintaining large language models. The large language model module 208A, in conjunction with the processor 204, can generate output extraction data from item descriptions. The large language model module 208A can be configured to train, maintain, and/or utilize the first large language model. In other embodiments, the large language model module 208A may comprise code, executable by the processor 204, for interacting with a large language model hosted by an external computer.

For example, the large language model module 208A, in conjunction with the processor 204, can generate a prompt based on the item description that indicates to the large language model to determine output extraction data. The prompt can indicate particular output extraction data. For example, the prompt can ask for the large language model to determine an item characteristic of item size. The prompt can also include the item description. In some embodiments, The large language model module 208A, in conjunction with the processor 204, can generate the prompt using a template and the item description. As an example, the prompt can be "determine a size for an item with the following description: [item_description]."

The large language model module 208A, in conjunction with the processor 204, can input the prompt into the large language model. In some embodiments, the large language model module 208A, in conjunction with the processor 204, can provide the prompt into a local large language model. In other embodiments, the large language model module 208A, in conjunction with the processor 204, can utilize an API call that includes the prompt to communicate with a remotely hosted large language model.

The large language model module 208A, in conjunction with the processor 204, can obtain output extraction data from the large language model based on the input prompt that includes the item description. The output extraction data can include item characteristic data that relates to the item description.

The classification model module 208B may comprise code or software, executable by the processor 204, for training, utilizing, and/or maintaining classification machine learning models. The classification model module 208B, in conjunction with the processor 204, can determine item characteristic classifications for item descriptions using a machine learning classification model. In other embodiments, the classification model module 208B may comprise code, executable by the processor 204, for interacting with a classification model hosted by an external computer.

The classification model module 208B, in conjunction with the processor 204, can train a machine learning classification model using item characteristic data and item descriptions from a database. The database can store item characteristic data and item description pairs. For example, the database can store an item characteristic of brand of "Brand_A" and an item description of "Brand_A Silk Glow Body Wash (500 ml)."

The classification model module 208B, in conjunction with the processor 204, can collect a set of item characteristic data and item description pairs from the database. The classification model module 208B, in conjunction with the processor 204, can create a first training set comprising the set of item characteristic data and item description pairs, for a first training stage. The classification model module 208B, in conjunction with the processor 204, can training the machine learning classification model using the first training set.

As more item characteristic data and item description pairs are added to the database, the classification model module 208B, in conjunction with the processor 204, can create a second training set comprising the item characteristic data and the item description, for a second training stage. The classification model module 208B, in conjunction with the processor 204, can train the machine learning classification model using the second training set.

The database module 208C may comprise code or software, executable by the processor 204, for accessing and/or modifying data in a database. The database module 208C, in conjunction with the processor 204, can store item characteristic data and item description pairs into the database.

The database module 208C, in conjunction with the processor 204, can obtain new item characteristic data and item description pairs from the large language model module 208A. The database module 208C, in conjunction with the processor 204, can determine whether or not the characteristic of the item characteristic data is already included in the database. If the item characteristic does not already exist in the database, then the database module 208C, in conjunction with the processor 204, can expand the database to include the new item characteristic. If the item characteristic does exist in the database, then the database module 208C, in conjunction with the processor 204, can utilizing the existing item characteristic in the database and can be associated with the item description with the existing item characteristic.

In some embodiments, the database module 208C, in conjunction with the processor 204, can utilize a second large language model to determine whether or not an item characteristic already exists in the database. For example, the database module 208C, in conjunction with the processor 204, can query the database for item characteristics that are similar to the new item characteristic. The database module 208C, in conjunction with the processor 204, can generate a prompt that includes a list of similar item characteristics from the database, the item characteristic data, and the item description. The database module 208C, in conjunction with the processor 204, can provide the prompt to the second large language model. The second large language model can generate a response that indicates a particular item characteristic to utilize in the database that matches and/or is most similar to the item characteristic data.

The network interface 206 may include an interface that can allow the central server computer 102 to communicate with external computers. The network interface 206 may enable the central server computer 102 to communicate data to and from another device (e.g., the logistics platform 104, the end user device 106, the transporter user device 114, the navigation network 120, the service provider computer 122, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 3:
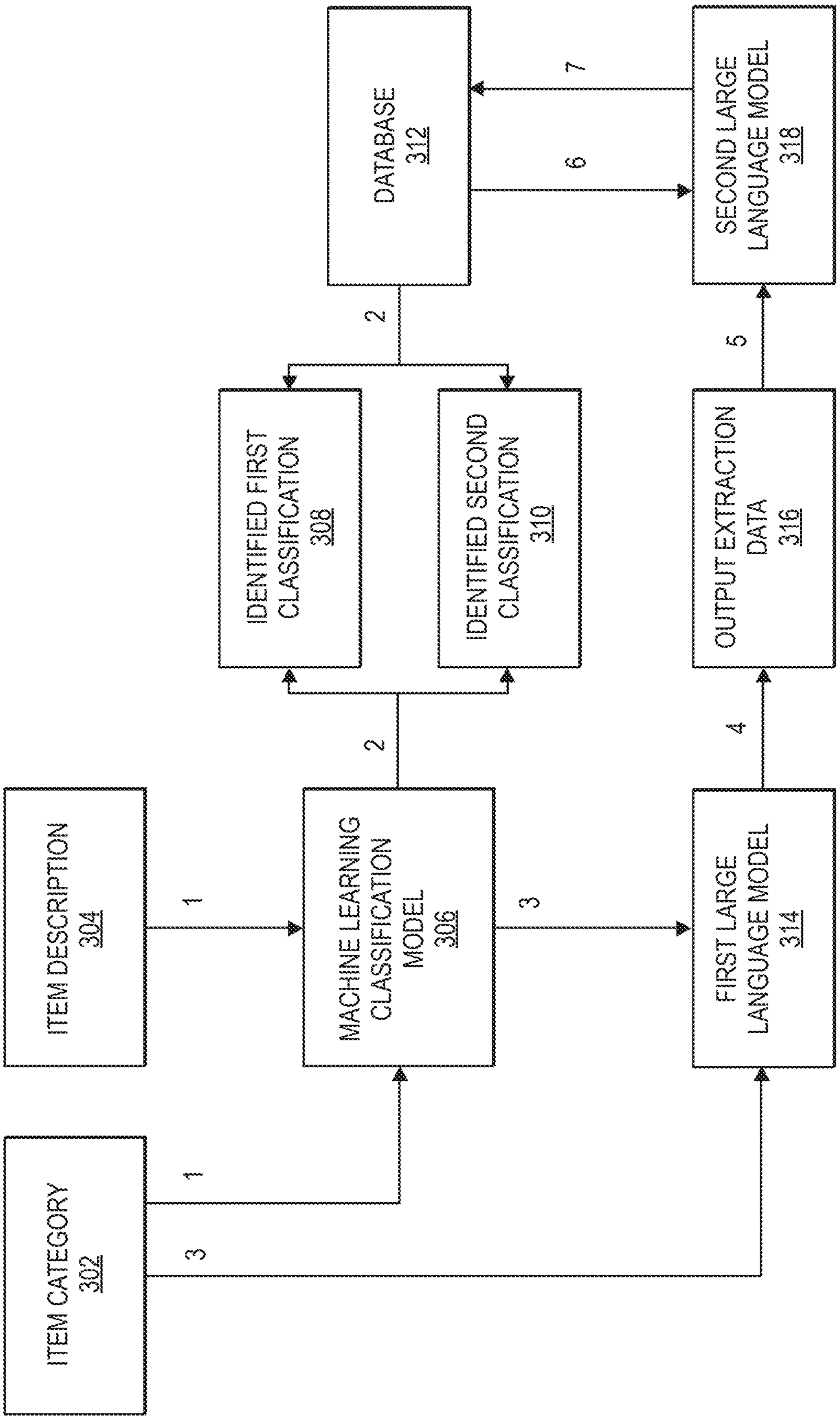
FIG. 3 shows a block diagram illustrating an output extraction data determination and training system according to embodiments.

Embodiments provide for a large language model powered item characteristic data extraction pipeline that can proactively identify new item characteristics at scale, improving both efficiency and accuracy. FIG. 3 shows the end-to-end item characteristic data determination pipeline.

At step 1, the service provider computer 122 can provide an item description 304 to the central server computer 102. The item description 304 can be a text description of the item or can be an item name of the item. In some embodiments, the item description 304 can be a data structure that includes item information for an item. In some embodiments, the item description 304 can include an image of the item.

As noted above, the central server computer 102 can be a computer that facilitates the fulfillment of fulfillment requests received from end user devices that request items from service providers associated with service provider computers.

In some embodiments, the central server computer 102 can obtain additional data related to the item description or related to an item associated with the item description. For example, the service provider computer 122 can also provide an item category 302 to the central server computer 102. The item category can be additional data. The item category 302 can indicate a particular category of item type to which the associated item description and item belong. For example, the item category 302 can be personal care, automotive, outdoors, household, food, clothing, etc. In some embodiments, there may be a hierarchical structure of item categories where some categories may have subcategories. The hierarchical structure of item categories can be maintained by the central server computer 102 and can be provided to the service provider computer 122 for item category determination.

The central server computer 102 can provide the item description 304, and in some embodiments, the item category 302, to a machine learning classification model 306 maintained by the central server computer 102. In some embodiments, the machine learning classification model 306 can be an entity linker that links input data to stored data in the database 312.

At step 2, the machine learning classification model 306 can determine one or more classifications and a confidence level for the item description 304. The machine learning classification model 306 can be trained using labeled item description data stored in the database 312. The machine learning classification model 306 can attempt to classify the received item description 304 as having a particular item characteristic (e.g., a particular brand, size, dietary restriction, alcohol content, age rating, etc.). The machine learning classification model 306 can attempt to classify the item description 304 as an item characteristic that is stored in the database 312.

For example, the machine learning classification model 306 can classify the item description 304 as an identified first classification 308 or an identified second classification 310. The item description 304 can be "Acme Silk Glow Body Wash (500 ml)," which can be associated with an item category 302 of "personal care" or "body washing." The machine learning classification model 306 can be trained to classify the brand of the item. The machine learning model 306 can then classify the item as an identified first classification 308 such as "Acme (toiletries)" or the identified second classification 310 such as "Acme (chocolate)." In this example, "Acme" may be a brand name for more than one type of product A brand can be an item characteristic used to distinguish one company's items from other companies' items. The central server computer 102 can store hierarchical knowledge graphs in a database that define a brand taxonomy that can break brands into categories such as manufacturer, parent brand, and sub-brand. Accurate brand tagging (e.g., determination) offers a number of downstream benefits, including increasing the granularity of item affinity for end users. Because the number of real-world brands is technically infinite, a constructed brand taxonomy is never complete. As the item spectrum expands, new brands can be included to close any coverage gaps.

The machine learning classification model 306 can determine a confidence level for the determined classification. In some embodiments, the machine learning classification model 306 can determine two or more classifications and two or more confidence levels for the item description using a machine learning classification. For example, the machine learning classification model 306 can determine a first confidence level of 0.98 for the identified first classification 308, and a second confidence level of 0.02 for the identified second classification 310.

The machine learning classification model 306 can compare each determined confidence level to a threshold confidence level to determine whether or not the identified classification is to be utilized. The machine learning classification model 306 can compare the first confidence level and the second confidence level to a threshold confidence level of 0.8 (or other threshold value). The machine learning classification model 306 can select the identified first classification 308 as being the classification that is to be associated with the item description 304.

However, in some cases, the machine learning classification model 306 may not have yet encountered a particular classification or does not have sufficient training data to accurately identify a classification. In such cases, the machine learning classification model 306 can determine a confidence level that is below the threshold confidence level. For example, the item description 304 can be "Brand_C Body Wash (250 ml)." The machine learning classification model 306 can determine a first confidence level of 0.2 for the identified first classification 308 of "Brand_A," and a second confidence level of 0.2 for the identified second classification 310 of "Brand_B." If the confidence level is less than the threshold confidence level (e.g., 0.75), then the central server computer can proceed to step 3.

At step 3, item descriptions 304 that cannot be tagged confidently to one of the existing data classifications (e.g., brands, sizes, or other item characteristic described herein) in the database 312 are provided to a first large language model 314 for item characteristic data extraction. The first large language model 314 can determine output extraction data 316 from the item description 304 and, in some embodiments, the item category 302. For example, the output extraction data 316 can include an identified brand for the item (e.g., "Acme Silk Glow Body Wash (500 ml)").

As an illustrative example, the central server computer 102 can utilize an application programming interface (API) call to communicate with the first large language model 314. The central server computer 102 can input the item description 304 and, in some embodiments, the item category 302 into the first large language model 314. The first large language model 314 can determine the output extraction data 316 that includes item characteristic data (e.g., "Acme" from "Acme Silk Glow Body Wash (500 ml)").

In some embodiments, the first large language model 314 can be trained and maintained by the central server computer 102 and may not require an API call to the first large language model 314.

At step 4, the first large language model 314 can return the output extraction data 316 to the central server computer 102.

At step 5, after determining the output extraction data 316, the central server computer 102 can proceed to add the output extraction data 316 to the database 312. The central server computer 102 can add the output extraction data 316 to the database 312 in any suitable manner, while deduplicating and expanding existing and new data entries. For example, the central server computer 102 can provide the output extraction data 316 from the first large language model 314 to the database 312 via a second large language model 318.

At step 6, the second large language model 318 can interface with the database 312. The second large language model 318 can identify and retrieve similar item characteristic data from the database 312 from the database 312 (e.g., an internal knowledge graph) to decide whether the extracted item characteristic data is a duplicate entry (e.g., is the same and/or similar to a stored item characteristic).

For example, the central server computer 102 can determine, using the second large language model 318, one or more stored item characteristics with associated brands from the database 312 that may be similar to the brand determined by the first large language model 314. The one or more example items can be similar based on any suitable criteria (e.g., word similarity, starting letter, length of word, etc.). The central server computer 102 can provide the one or more stored item characteristics along with the output extraction data 316 into the second large language model 318 using an API call. The second large language model 318 can determine whether or not the brand of the output extraction data 316 is associated with any of the one or more stored item characteristics with associated brands from the database 312. The second large language model 318 can output an indication of whether or not a match has been found.

At step 7, if the item characteristic data of the output extraction data 316 does not match any stored item characteristic data, then the central server computer 102 can store the item characteristic data (e.g., brand) of the output extraction data 316 into the database 312 in association with the item description. As such, the item characteristic data and the item description can form an item characteristic data and item description pair that can be utilized for training the machine learning classification model 306. The item characteristic data and item description pair can be labeled training data where the item characteristic data is a label for the item description.

If the item characteristic data of the output extraction data 316 matches a stored item characteristic data, then the central server computer 102 can store the item description in association with the previously stored item characteristic data in the database 312. Or, if it is a true duplicate of previously stored item characteristic data, then the output extraction data 316 can be deleted in a deduplication process.

After step 7, the central server computer 102 can further train the machine learning classification model 306 with the newly added data from the database 312. For example, the machine learning classification model 306 can be a machine learning model that classifies item characteristics based on item descriptions. The machine learning classification model 306 can be further trained with the item description and a label of the extracted item characteristic data to improve classification accuracy with the particular item characteristic.

Implementations of embodiments of the invention significantly improved the efficiency and quality of the brand tagging workflow. After the model was used, they classified brand labels for 6 million items in 20 hours that otherwise would require 4593 hours from a 10-person operator team to complete. The model also achieved a 98% accuracy at tagging the correct brand for an item. In comparison, the accuracy of a human workflow is about 90%. The accuracy improvement came from the fact that model uses semantic information from the item description to infer the brand, whereas human largely leverages text similarity which is more prone to errors when multiple brands have similar names.

Item characteristic data need not be limited to brand. Item characteristic data can include other characteristics of items that are provided by service providers to end users. For example, item characteristic data can include dietary restriction data. The central server computer 102 can identify item characteristic data that includes dietary restriction data in different manners.

The central server computer 102 can determine item details (e.g., a list of ingredients, a list of item warnings, a list of item allergens, etc.) related to an item description for a particular item. In some embodiments, determining the item details includes the central server computer 102 performing one or more search engine queries for information related to the item and generating the item details using results from the one or more search engine queries. In other embodiments, the central server computer 102 may receive the item details from the service provider computer 122. The central server computer 102 can augment the item description using the item details. The central server computer 102 can then use the augmented item description to determine item characteristic data (e.g., vegan, gluten-free, dairy-free, etc.) for the item using a large language model.

Figure 4:
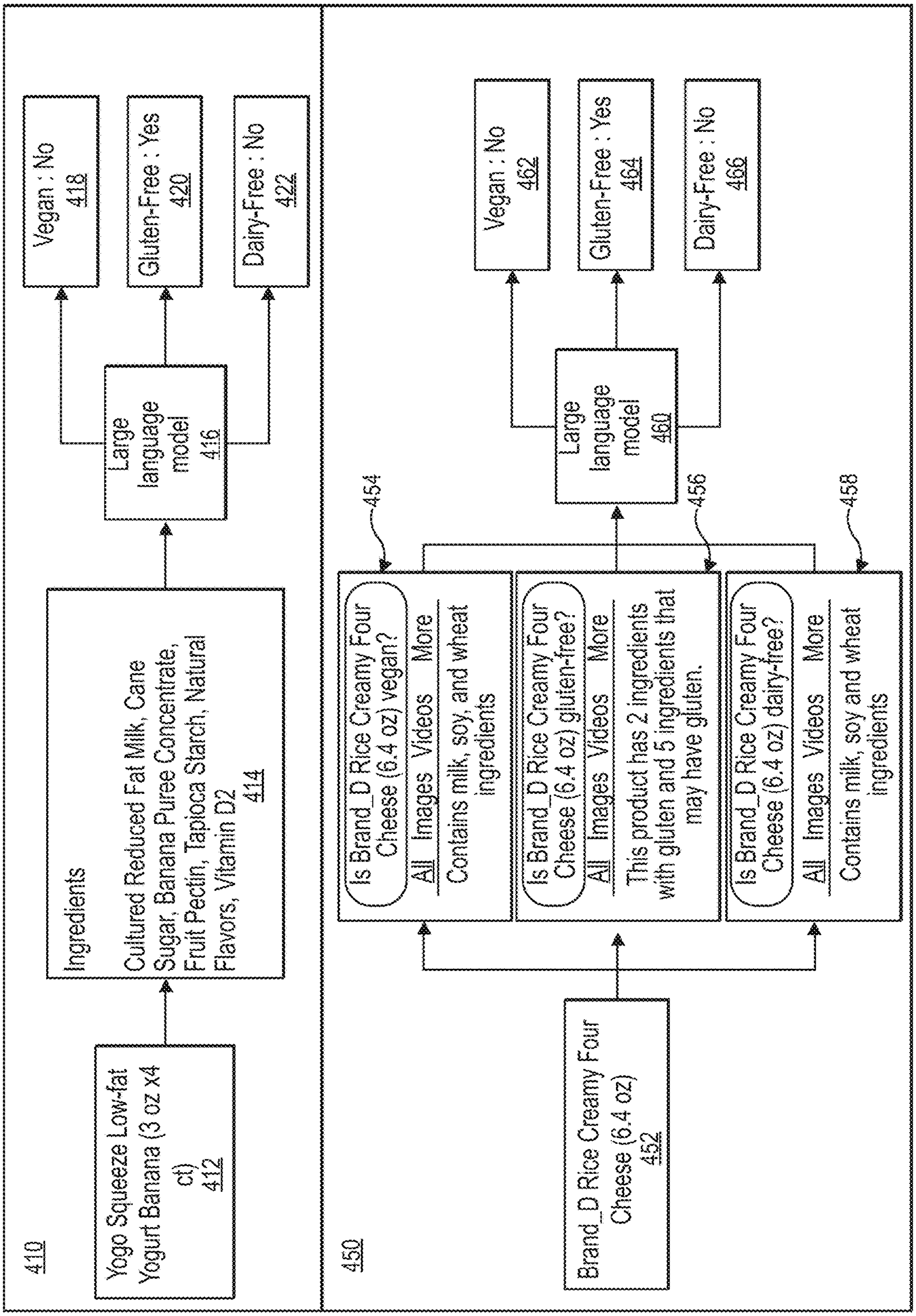
FIG. 4 shows a block diagram illustrating a dietary tagging method according to embodiments.

FIG. 4 shows a block diagram illustrating a dietary tagging method according to embodiments. FIG. 4 shows two example methods of how large language models can be utilized to determine item characteristic data that includes dietary restriction data for items that are to be added to a delivery platform. FIG. 4 includes a first example 410 and a second example 450.

By utilizing large language models in such a manner, embodiments solve the technical challenge of insufficient data and can answer inferential questions via searching and reasoning using external data.

The first example 410 can occur when the central server computer 102 has access to item details 414 related to an item of the item description 412. For example, the service provider computer 122 can provide the item description 412 and the item details 414 to the central server computer 102.

For example, the central server computer 102 can receive the item description 412 of "Yogo Squeeze Low-fat Yogurt Banana (3 oz×4 ct)" from the service provider computer 122. The central server computer 102 can also obtain the item details 414 that indicate the ingredients of the associated item: "Cultured Reduced Fat Milk, Cane Sugar, Banana Puree Concentrate, Fruit Pectin, Tapioca Starch, Natural Flavors, Vitamin D2" from the service provider computer 122 or from some other source.

The central server computer 102 can augment the item description 412 using the item details 414. For example, the central server computer 102 can concatenate the item description 412 and the item details 414. In some embodiments, the central server computer 102 can combine the item description 412 and the item details 414 using a combination template that indicates how to combine the item description 412 and the item details 414. For example, a combination template can include "[item_description] has the ingredients of [item_details]."

The central server computer 102 can then input the augmented item description into a large language model 416. The central server computer 102 can utilize an API call to provide the data to the large language model 416 or can store the large language model 416 and can communicate with the large language model 416 locally. The central server computer 102 can prompt the large language model 416 to determine whether or not the input augmented item description is associated with an item that has particular dietary restrictions (e.g., vegan, gluten-free, dairy-free, etc.).

The central server computer 102 can utilize a prompt template to generate a prompt using the augmented item description. For example, the central server computer 102 can generate a prompt of "is the following food vegan: [item_description] has the ingredients of [item_details]" to determine a classification for a dietary restriction of vegan. The central server computer 102 can further include prompts for other dietary restrictions, such as gluten-free, dairy-free, vegetarian, etc.

The large language model 416 can output extracted data that indicates whether or not the item is associated with the particular dietary restrictions. For example, the large language model 416 can output the following information: (vegan: no) 418, (gluten-free: yes) 420, and (dairy-free: no) 422 for the augmented item description.

The second example 450 can occur when the central server computer 102 does not have access to item details related to an item of an item description 452 received from the service provider computer 122, but can rather obtain the item details from an alternate source.

For example, the central server computer 102 can obtain the item description 452 of "Brand_D Rice Creamy Four Cheese (6.4 oz)" from the service provider computer 122.

The central server computer 102 can obtain item details from an alternate source, such as from one or more search engines that search for results on the Internet. The central server computer 102 can utilize a search engine that searches the Internet and can return search results. The central server computer 102 can call a search API using the item description as input. The computer can obtain an output that includes search results that are associated with the item description.

For example, the central server computer 102 can determine the item details (e.g., a list of ingredients, a list of allergens, a list of warnings, etc.) by performing one or more search engine queries for information related to the item. The central server computer 102 can generate the item details using results from the one or more search engine queries.

FIG. 4 illustrates three search engine queries, including a first search engine query 454, a second search engine query 456, and a third search engine query 458. The query for the first search engine query 454 can be "Is Brand_D Rice Creamy Four Cheese (6.4 oz) vegan?" The first search engine query 454 can provide the result of "contains milk, soy, and wheat ingredients." The query for the second search engine query 456 can be "Is Brand_D Rice Creamy Four Cheese (6.4 oz) gluten-free?" The second search engine query 456 can provide the result of "this product has 2 ingredients with gluten and 5 ingredients that may have gluten." The query for the third search engine query 458 can be "Is Brand_D Rice Creamy Four Cheese (6.4 oz) dairy-free?" The third search engine query 458 can provide the result of "contains milk, soy, and wheat ingredients."

The results from the search engine queries can be item details related to the item description. The central server computer 102 can augment the item description with the item details determined from the one or more search engine queries. For example, the central server computer 102 can combine the item description with the item details by concatenating the item details to the end of the item description. In some embodiments, the central server computer 102 can augment the item description with both the item details and the search engine query.

The central server computer 102 can input the augmented item description into large language model 460 to determine whether or not the associated item has particular dietary restrictions (e.g., vegan, gluten-free, dairy-free, etc.).

The large language model 460 can output extracted data that indicates whether or not the item is associated with the particular dietary restrictions. For example, the large language model 460 can output the following information: (vegan: no) 462, (gluten-free: no) 464, and (dairy-free: no) 466.

As another example, the item characteristic data can include alcohol characteristic data. The central server computer 102 can determine whether or not two item descriptions refer to the same underlying item. For example, "X Lager (12 oz×12 ct)" sold by a first service provider can be the same item as "X Lager Bottles, 12 pk, 12 fl oz" sold by a second service provider. The central server computer 102 needs accurate item resolution to build the database 124, which can provide accurate information to end users. Linking these two items together in the database 124 (e.g., deduplicating the database 124 to include one item that is associated with the two item descriptions) is a challenging technical problem. This technical problem requires validating that both item descriptions match all item characteristics exactly, which means there needs to be accurate extraction of all applicable characteristics in the first place. An alcohol related item can have a large number of uniquely defining characteristics because different types of alcohol have varying applicable characteristics, for instance: "vintage" for wine, "aging" for spirits, and "flavor" for beer. The central server computer 102 can utilize the system described in FIG. 3 to determine item characteristic data for different characteristics (e.g., alcohol content, vintage, age, flavor, etc.) for item descriptions, so that the database 124 can be expanded and deduplicated to include alcohol characteristic data and item description pairs. The alcohol characteristic data and item description pairs can be utilized to train the machine learning classification model to identify the alcohol characteristic data for new item descriptions.

Figure 5:
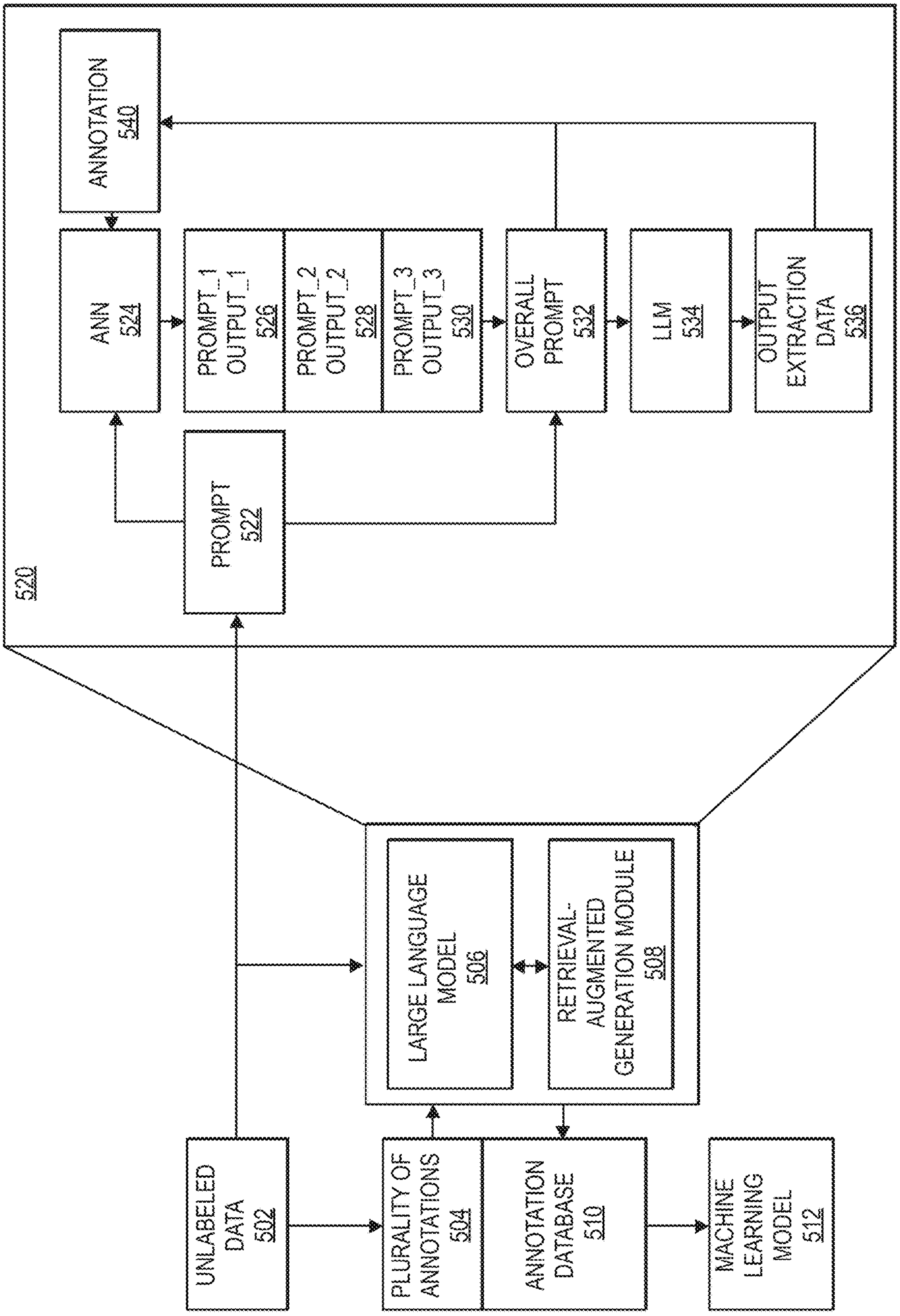
FIG. 5 shows a block diagram illustrating a retrieval-augmented generation modified method according to embodiments.

The central server computer 102 can use large language models and retrieval-augmented generation (RAG) to accelerate label annotations. Retrieval-augmented generation can be a technique for enhancing the accuracy and reliability of generative AI models with facts fetched from external sources. For each unannotated item description, the central server computer 102 can first leverage existing item description embeddings (e.g., such as OpenAI embeddings) and the approximate nearest neighbors technique to retrieve the most similar item description from a golden set. The central server computer 102 can pass these golden annotation examples to a large language model to generate labels for the unannotated item descriptions. Ultimately, the generated annotations (e.g., item characteristic data used as labels) can be used to fine-tune a large language model for more scalable inference as shown in FIG. 5.

During testing, this approach enabled the central server computer 102 to generate 300,000 annotations in 3 hours that would otherwise require 1392 hours from a 10-person operator team to collect, allowing embodiments to focus on the actual model development and streamlining the launch of item-first search. The extracted item characteristics data allowed us to train an item linking model that achieved 98% accuracy. In comparison, linking accuracy of human is about 90%. Item characteristic data extraction not only allows the central server computer 102 to better represent each item in the database but also empowers downstream machine learning models that improve a user's experience. Characteristics such as brand and dietary tags can be important features in a personalized ranking models, which recommend items that reflect a user's unique needs and preferences. Characteristics such as item category and size enable recommending more relevant substitutions when the original item is out of stock, giving users a smooth fulfillment experience.

At step 502, the computer can receive unlabeled data. The unlabeled data can include an item description. The item description is not yet labeled with item characteristic data.

At step 504, the computer can obtain a plurality of annotations (e.g., example item characteristic data), from the database 124, which are related to the item description. The plurality of annotations, in some embodiments, can be subject matter expert created labels. The plurality of annotations can include a few annotations (e.g., 2-5 annotations).

At step 506, the computer can input the item description and the plurality of annotations into a large language model. The large language model can determine output extraction data that is an output label that can be used as an annotation to annotate item descriptions. The output extraction data can be item characteristic data.

At step 508, the computer can provide the item characteristic data to the retrieval-augmented generation module for training a machine learning model that determines optimal annotations for the large language model based on the inputs and outputs of the large language model.

At step 510, the computer can determine annotations (e.g., output extraction data that labels the item description) using the retrieval-augmented generation module. The computer can store the annotations in the annotation database (e.g., the database 124).

At step 512, the computer can train a machine learning model that classifies items using item descriptions and item characteristic data, where the item descriptions can be labeled by the item characteristic data.

Further details of the large language model and the retrieval-augmented generation module are described in details 520. The steps included in the details 520 can be performed during steps 506 and 508.

At step 522, the computer can determine a prompt. The prompt can include the unlabeled data (e.g., the item description). The prompt can also include additional text. For example, the prompt can include a question or statement associated with the item description. The prompt can be an input that can be provided to the large language model.

As an illustrative example, the item description can be "crisp garden salad with locally sourced greens from Sunny Fields Farm, tossed with vine-ripened tomatoes and house-made vinaigrette." The computer can determine an item characteristic of "vegan" based on the item description using the method illustrated in FIG. 5. The computer can generate a prompt such as "is the [item_description] a vegan food dish."

At step 524, the computer can input the prompt into an artificial neural network (e.g., a machine learning model), which can be associated with the retrieval-augmented generation module, to determine one or more example annotations (e.g., example item characteristic data). The artificial neural network can be trained to generate prompt and output extraction data (e.g., resulting item characteristic data) pairs. The artificial neural network can be trained using previously determined output extraction data for input prompts and associated item descriptions.

For example, at step 526, the artificial neural network can generate a first prompt and a first resulting item characteristic data associated with the first prompt based on the current prompt from step 522. The generated prompts can be similar to the current prompt. For example, the first prompt can be "is the [item_description] considered to be vegan." The first resulting item characteristic data can be a classification of "vegan."

At step 528, the artificial neural network can generate a second prompt and a second resulting item characteristic data associated with the second prompt based on the current prompt. For example, the second prompt can be "is a crisp garden salad with greens, vine-ripened tomatoes, and vinaigrette vegan." The second resulting item characteristic data can be a classification of "vegan."

At step 530, the artificial neural network can generate a third prompt and a third resulting item characteristic data associated with the third prompt based on the current prompt. For example, the third prompt can be "can someone who is vegan eat [item_description]." The second resulting item characteristic data can be a classification of "vegan."

At step 532, the computer can from an overall prompt based on the prompt and the artificial neural network generated prompts. The overall prompt can include the prompt and the artificial neural network generated prompts. For example, the overall prompt can include the prompt and can indicate the artificial neural network generated prompts as being examples. The computer can generate the overall prompt using a template such as "answer the [prompt], with the additional examples of [artificial neural network generated prompts]."

At step 534, the computer can input the overall prompt the large language model to determine output extraction data (e.g., item characteristic data). At step 526, the large language model can determine the output extraction data as described herein. The output extraction data along with the overall prompt can be utilized as a new annotation, at step 540, to further train the artificial neural network. The output extraction data and the overall prompt can be utilized to further train the artificial neural network that determines optimal annotations. The new annotations can be stored in an annotation database.

The output extraction data can be associated with the originating item description and can be utilized as described in FIG. 3 to train a machine learning classification model that classifies item characteristic data for item descriptions.

Embodiments provide for a number of advantages. Machine learning classifiers can be trained to determine classifications of characteristics of item data when the central server computer receives the item data for the first time from the service provider computer. However, building an item characteristics data determination and/or tagging classification model from scratch faces a number of technical problems and requires a significant amount of labeled training data to reach the desired accuracy. This is often known as the cold-start problem of natural language processing (NLP). Data collection slows model development, delays adding new items to the active database, and creates computational resource costs. Embodiments solve such technical problems by utilizing large language models to generate labeled item descriptions (e.g., that are labeled with item characteristic data). For example, embodiments can utilize large language models (LLMs) to circumvent the cold-start problem by generating labeled item characteristic data.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:

receiving, by a computer, an item description;

determining, by the computer, two or more classifications and two or more confidence levels for the item description using a machine learning classification model;

determining, by the computer, that the two or more confidence levels are below a predetermined confidence threshold;

responsive to determining that the two or more confidence levels are below the predetermined confidence threshold, determining, by the computer, output extraction data from the item description using a first large language model, wherein the output extraction data includes item characteristic data;

storing, by the computer, the item description and the output extraction data in a database;

training, by the computer, the machine learning classification model using the item characteristic data and the item description in the database;

receiving, by the computer, a subsequent item description;

determining, by the computer, one or more classifications and one or more confidence levels for the subsequent item description using the trained machine learning classification model, wherein the one or more classifications are based on the item characteristic data;

determining, by the computer, that the one or more confidence levels are above the predetermined confidence threshold; and responsive to determining that the one or more confidence levels are above the predetermined confidence threshold, providing, by the computer, the subsequent item description and the one or more classifications to an application, which allows a user to order an item associated with the subsequent item description and the one or more classifications.

2. The method of claim 1, further comprising:

determining, by the computer, whether or not the item characteristic data matches previously stored item characteristic data in the database.

3. The method of claim 2, wherein further determining whether or not the item characteristic data matches the previously stored item characteristic data in the database further comprises:

determining, by the computer, whether or not the item characteristic data matches the previously stored item characteristic data in the database using a second large language model.

4. The method of claim 1, further comprising:

obtaining, by the computer, additional data related to the item description or related to an item associated with the item description.

5. The method of claim 4, wherein determining the output extraction data further comprises:

determining, by the computer, the output extraction data from the item description and the additional data using the first large language model, wherein the additional data is an item category.

6. The method of claim 1, wherein the item characteristic data comprises dietary restriction data, brand data, alcohol characteristic data, or size data.

7. The method of claim 1 further comprising:

augmenting, by the computer, the item description with item details.

8. The method of claim 7, wherein the item details are for an item associated with the item description, wherein the method further comprises:

performing, by the computer, one or more search engine queries for information related to the item; and generating, by the computer, the item details using results from the one or more search engine queries.

9. The method of claim 7, wherein the item details include ingredients that are in an item associated with the item description.

10. The method of claim 1 further comprising:

determining, by the computer, a prompt based on the item description;

determining, by the computer, a plurality of artificial neural network generated prompts using an artificial neural network based on the prompt; and creating, by the computer, an overall prompt comprising the prompt and the plurality of artificial neural network generated prompts, wherein determining the output extraction data comprises:

determining, by the computer the output extraction data based on the overall prompt.

11. The method of claim 10 further comprising:

training, by the computer, the artificial neural network using the overall prompt and the output extraction data.

12. The method of claim 1, wherein the item is a food item.

13. The method of claim 1, wherein the application is a food delivery application.

14. A computer comprising:

a processor; and a computer-readable medium coupled to the processor, the computer-readable medium comprising code executable by the processor for implementing a method comprising:

receiving an item description;

determining two or more classifications and two or more confidence levels for the item description using a machine learning classification model;

determining that the two or more confidence levels are below a predetermined confidence threshold;

responsive to determining that the two or more confidence levels are below the predetermined confidence threshold:

determining output extraction data from the item description using a first large language model, wherein the output extraction data is item characteristic data; and storing the item description and the output extraction data in a database;

training the machine learning classification model using the item characteristic data and the item description in the database;

receiving a subsequent item description;

determining, by the computer, one or more classifications and one or more confidence levels for the subsequent item description using the trained machine learning classification model, wherein the one or more classifications are based on the item characteristic data;

determining that the one or more confidence levels are above the predetermined confidence threshold; and responsive to determining that the one or more confidence levels are above the predetermined confidence threshold, providing, by the computer, the subsequent item description and the one or more classifications to an application, which allows a user to order an item associated with the subsequent item description and the one or more classifications.

15. The computer of claim 14, wherein the method further comprises:

collecting a set of item characteristic data and item description pairs from the database;

creating a first training set comprising the set of item characteristic data and item description pairs, for a first training stage; and training the machine learning classification model using the first training set.

16. The computer of claim 15, wherein the item characteristic data and the item description are in a second training set, wherein the machine learning classification model is trained using the second training set.

17. The computer of claim 14 further comprising:

a large language model module configured to train, maintain, and/or utilize the first large language model;

a classification model module configured to train, maintain, and/or utilize the machine learning classification model; and a database module configured to communicate with the database.

18. The computer of claim 14, wherein the item description is received from a service provider computer, wherein the computer is a central server computer that facilitates in fulfillment of fulfillment requests received from end user devices that request items from a service provider associated with the service provider computer.

19. The computer of claim 14, wherein the item is a food item.

20. A system comprising:

a service provider computer in operative communication with a central server computer; and the central server computer comprising:

a processor; and a computer-readable medium coupled to the processor, the computer-readable medium comprising code executable by the processor for implementing a method comprising:

receiving an item description;

determining two or more classifications and two or more confidence levels for the item description using a machine learning classification model;

determining that the two or more confidence levels are below a predetermined confidence threshold;

responsive to determining that the two or more confidence levels are below the predetermined confidence threshold:

determining output extraction data from the item description using a first large language model, wherein the output extraction data is item characteristic data;

storing the item description and the output extraction data in a database;

training the machine learning classification model using the item characteristic data and the item description in the database;

receiving a subsequent item description;

determining one or more classifications and one or more confidence levels for the subsequent item description using the trained machine learning classification model, wherein the one or more classifications are based on the item characteristic data;

determining that the one or more confidence levels are above the predetermined confidence threshold; and responsive to determining that the one or more confidence levels are above the predetermined confidence threshold, providing the subsequent item description and the one or more classifications to an application, which allows a user to order an item associated with the subsequent item description and the one or more classifications.

* * * * *